Patented Apr. 24, 1934

1,956,426

UNITED STATES PATENT OFFICE 1,956,426

SPICE PRODUCT

Ronald B. McKinnis, Pittsburgh, Pa., assignor to Continental Can Company, Inc., New York, N. Y., a corporation of New York No Drawing. Application March 27, 1933, Serial No. 663,103

1 Claim. (Cl. 99—11)

The invention relates to new and useful improvements in aromatic vegetable tissues prepared for extraction.

An object of the invention is to provide vegetable tissues having the properties of spices in form for use in the preparation or preservation of food products in which the cooking or preserving liquor will have ready and equal access to all parts of the tissue and the soluble aromatic principles thereof.

A further object of the invention is to prepare such vegetable tissue in a form suitable for extraction by either maceration or percolation with either a hot or cold extracting liquid.

The invention is directed more particularly to aromatic spice products for use in the preparation or preservation of foods and for the preparation of flavoring extracts. The word "spice" is used to define an aromatic, pungent vegetable tissue used to flavor foods and beverages and also such substances collectively. The term "spice" is defined further as applying to a vegetable tissue which may comprise seeds, or the receptacles thereof, arils, flowers, unexpanded flowers, flower buds and inflorescences, leaves, barks, woods and roots, used separately or collectively, either directly or as extracts thereof by reason of their content of aromatic principles which are known to chemists as volatile, essential or ethereal oils. As specific examples thereof may be mentioned pepper, allspice, nutmegs, cloves, vanilla beans, balm of Gilead buds, bay leaves and celery tops, cinnamon bark, sandalwood and ginger root, and many other such tissues known to chemical, pharmaceutical or food specialists. Such tissues are used in the preparation of soups, ketchups, pickles and other comestibles, and in the preparation of extracts for the flavoring of foods and beverages, and for use as carminatives in the compounding of various medicinal preparations.

It has been a common practice to use spices as whole spices and also in a comminuted condition in the preparation of many food products such as mixed pickles, jams, mince meats, etc. Whole spice is often used for the reason that when the spices are used in ground form, they contribute an unsightly, muddy appearance to the food product by reason of their fine state of comminution. When, however, the spices are used in whole form, they often contribute an unfavorable quality to the food product by introducing disagreeable masses of woody tissue. It is also found in the manufacture of spice extracts by maceration or percolation that the spices must be finely ground or comminuted in order to render their soluble aromatic principles readily accessible to the extracting liquid. This finely ground material is difficult to separate from the resulting extract by filtration by reason of the clogging of the filter medium. When the finely ground material is extracted by percolation, there is often a swelling of the tissue on first contact with the menstruum which clogs the percolating apparatus and impedes the ready flow of the extracting liquid.

The purpose of the present invention is to prepare the leafy, woody and seed tissues of spices for extraction, so as to avoid the objections stated above. This has been accomplished by reducing the tissues to the form of firm coherent flakes of such thinness as to render all of the soluble principles readily accessible to the extracting liquid. I have found it expedient to reduce the tissues of spices to approximately a thinness of .001 of an inch. This is accomplished by breaking the tissues, when necessary, into particles, tempering the particles to render them pliable and then subjecting the same to pressure. The flakes are produced by a plastic flow within the tissues so that the particles are simultaneously made thinner and increased in area, rupturing the cells but without completely disintegrating the tissues. The flake thus formed is of such thinness that all of the soluble principles are rendered substantially equally accessible to the extracting liquid and the extraction takes place in certain products almost instantly. The flakes are irregular in outline and as to size may vary from one-sixteenth to three-eighths of an inch in diameter, depending upon the product being prepared and the size of the particles which are reduced to flake form.

It is thought that the product will be better understood by a brief description of the preferred method of making the same. The first step in the reducing of the tissues of the spices to flaked form consists in moistening or tempering the spices so that they become pliable. This may be accomplished by applying a spray of water or a jet of steam to the spices. Inasmuch as steam vaporizes the aromatic substances, it is preferred to temper the spices by tumbling them in a warm room or in a container, the atmosphere of which is saturated with water vapor. The spices slowly absorb the moisture and become pliable. One or two days may be necessary for uniformly completing the tempering of the spices.

The next step in the method of producing the flakes consists in passing the spice tissue particles between rolls whereby the tissues are subjected to tremendous crushing pressure. The rolls are preferably hot and the spice particles pass from the rolls in thin coherent flakes, which, in the case of leaves, are almost transparent. The spices treated in this manner produce a product which gives up its aromatic principles almost instantly to cooking, preserving or extracting liquors. The flakes are of such a coherent character as to remain intact and thus the unsightly, muddy appearance given to the food products by the finely comminuted spice is avoided. Inasmuch as all of the aromatic principles are readily accessible to the extracting liquid, a much smaller quantity of the spice is necessary for the purpose of flavoring the food product and the woody tissues introduced into the food product are reduced to a minimum.

When the spice particles are reduced to flake form, they are instantly wettable by the cooking, preserving or extracting liquid. During the process of maceration or brewing the ready wetting of the ingredients results in a rapid settling of the particles. When the flakes are used in a percolator they overlie and overlap and any swelling of the flake is in a lateral direction and this does not appreciably restrict the flow of the extracting liquid.

As an example, the preparation of a flaked product from whole cloves will be described. The cloves are tempered by the addition of water vapor in the manner above described. By this moistening of the cloves, it is possible to hydrate the fibers and gummy materials sufficiently to cause them to flow during rolling and to produce thin coherent flakes. The cloves may be coarsely ground before or after tempering. The tempered particles of the cloves are then passed between heated rollers or subjected in some other way to heavy pressure, the result of which is to reduce the particles to the form of flakes which are thin and coherent. This pressure produces a plastic flow within the particles and the particles are simultaneously made thinner and increased in area, rupturing many of the cells but without disintegrating the fibers. Not only is the particle reduced to a coherent flake but the flake is of such thinness that all of the soluble aromatic principles are rendered substantially equally accessible to an extracting liquid. Such clove flakes are almost instantly penetrated by water, vinegar or alcohol and they are more suitable to the manufacture of preserves and mixed pickles and for the manufacturing of clove extract by percolation with alcohol or acetic acid. I have also found that the volatile oil of cloves may be more easily separated from this flaked product by the method of steam distillation.

Whatever method may be used for moistening the particles for the tempering of the same, only sufficient moisture is introduced to cause the woody particles to flow into flaked form under the extreme pressure produced by the rolls. The finished flakes are not wet, but are dry, and contain little moisture in excess of that present in the unground or unflaked spice product. Therefore, the flaked spice product may be kept indefinitely, provided, of course, that it is sealed in proper containers so as to prevent the circulation of air therethrough.

Having thus described the invention what I claim as new and desire to secure by Letters Patent is:

A dry spice product for flavoring consisting of aromatic vegetable tissues in the form of firm individual flakes, each having a coherent crushed fibrous structure containing many of the cells in a ruptured state and with the tissues thereof only partially disintegrated, which flakes are of such uniform thinness as to render the aromatic principles thereof substantially equally accessible to an extracting medium.

RONALD B. McKINNIS.